(No Model.)
2 Sheets—Sheet 1.
W. D. BROOKS.
CAN SOLDERING MACHINE.
No. 421,043.   Patented Feb. 11, 1890.
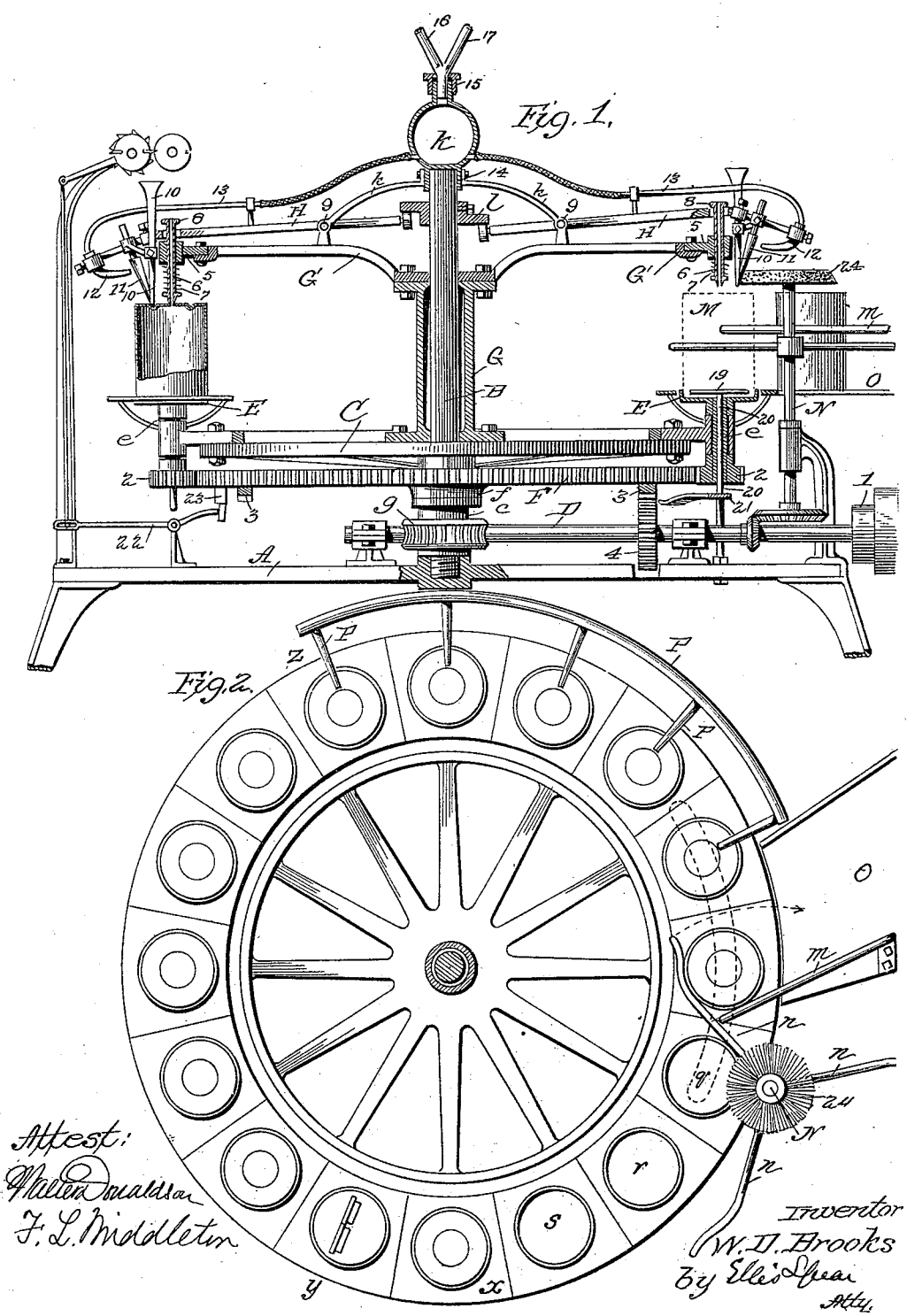

(No Model.) 2 Sheets—Sheet 2.
W. D. BROOKS.
CAN SOLDERING MACHINE.
No. 421,043. Patented Feb. 11, 1890.
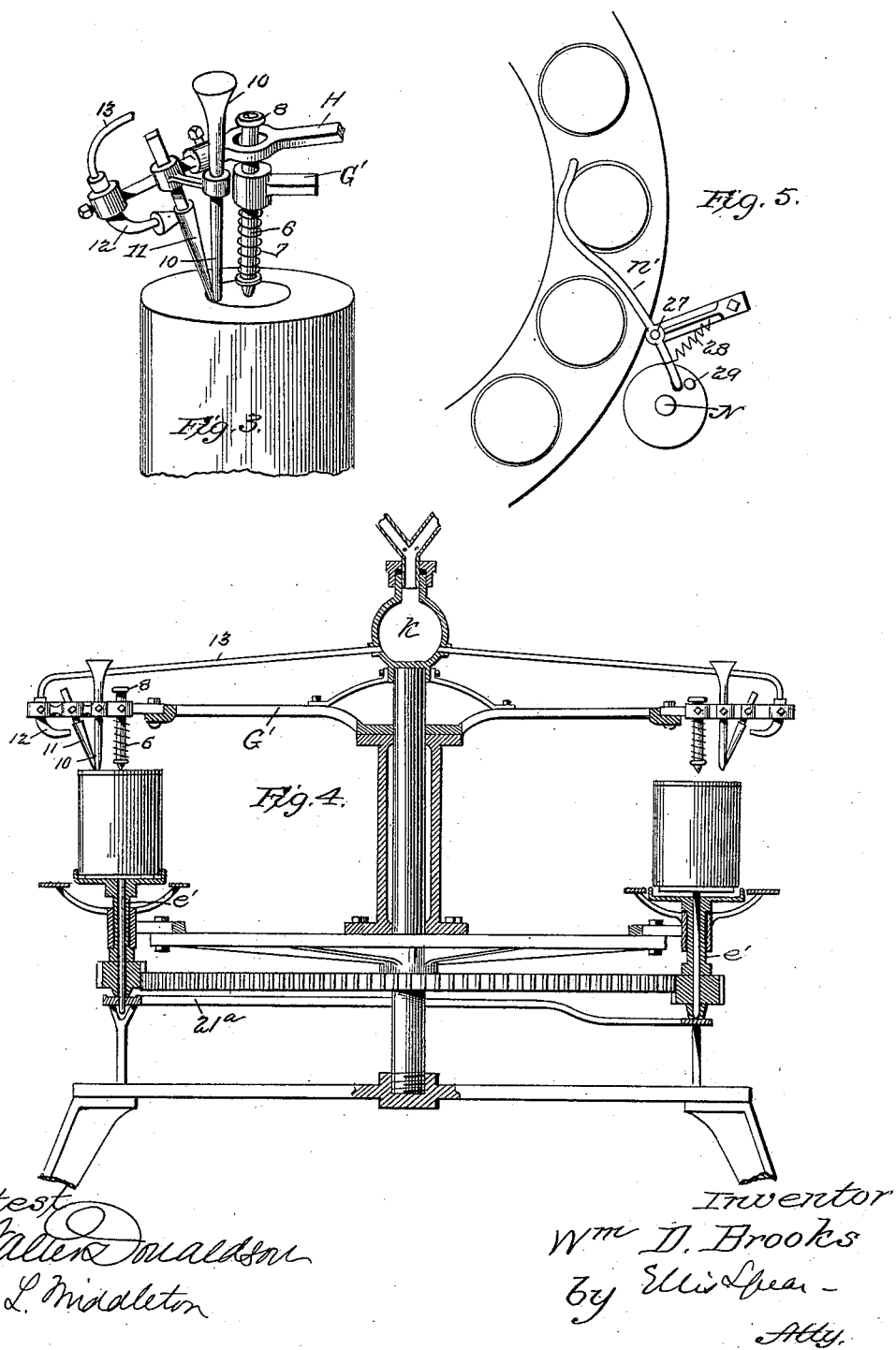

UNITED STATES PATENT OFFICE.

WILLIAM D. BROOKS, OF BALTIMORE, MARYLAND.

CAN-SOLDERING MACHINE.

SPECIFICATION forming part of Letters Patent No. 421,043, dated February 11, 1890.

Application filed November 2, 1889. Serial No. 329,000. (No model.)

*To all whom it may concern:*

Be it known that I, WILLIAM D. BROOKS, of Baltimore, in the State of Maryland, have invented a new and useful Improvement in Can-Soldering Machines; and I do hereby declare that the following is a full, clear, and exact description of the same.

My invention hereinafter described pertains to machinery for capping cans; and it is also applicable, without material change, to soldering the seams of cans.

The object I have had in view is to provide for the more certain and accurate performance of the work of capping and soldering cans by machinery.

The general organization of the machine hereinafter shown includes a movable table, a series of can-seats which also revolve on their respective axes as they move onward, and which are provided with a soldering-iron arranged over each can-seat and carried therewith. In the form shown the table which carries the can-seats is made circular, rotates on a fixed shaft, and the can-seats revolve on their spindles while moving in a circular path. This is the simplest form of carrier for the general purpose, but, as is well known, it is not the only one.

The general organization of the machine permits continuous movement of the table and carries the can-seats, and the details shown are adapted for that purpose, but some of them also being a part of my invention and adapted to intermittingly-moved can-seats.

In the accompanying drawings, which illustrate my invention, Figure 1 represents a central vertical section of the improved machine. Fig. 2 is a plan view of the table and can-seats. Fig. 3 is a perspective view of the upper part of the can with its cap, and of the special soldering and can-holding devices. Fig. 4 illustrates a modification in view similar to Fig. 1. Fig. 5 is a plan view of a modified form of can-discharging devices.

In the drawings, A represents the base, in the center of which is fixed a post B. Upon this post is arranged a table C in the form of a wheel, the hub of which consists of a sleeve *c*, which surrounds and turns upon the post, the lower end resting upon the base. Upon the lower end of the sleeve is a worm-gear *g*, which is driven by the shaft D, on the upper end of which is a driving-pulley 1. On the table C, thus continuously turned, is carried a series of can-seats E, mounted on tubular spindles *e*, which turn in brackets fixed to the periphery of the table. The lower end of every one of these spindles is provided with a pinion 2, which is in mesh with the master-wheel F. This master-wheel has a hub *f*, which turns on the sleeve *c* of the table C. On the under face of this wheel is a circular rack 3, which is in mesh with the gear-wheel 4 on the shaft D. This gives continuous movement independently of the whole series of can-seats.

Upon the table C is fixed a sleeve G, concentric with the post B, and on the top of this sleeve is bolted a wheel G', the periphery of which carries the brackets 5, which support the holding-down mechanism consisting of hollow pins that hold down the caps. These pins are represented at 6. Their tubular form affords ventilation. Each is mounted vertically in its bracket, and is pressed down by a spring 7 on the top or cap of the can. Its upper end passes through a pivoted lever H, and is provided with a flange or head 8, whereby at the proper time it is lifted. The levers H are pivoted at 9 on the standards of the wheel G'. On their outer ends they carry each a feed-tube, a soldering-iron, and a gas or vapor burner. The feed-tube for the solder is shown at 10. It is a hollow funnel-shaped tube arranged with its lower end in line with the seam of the cap, and is supported in a bracket on the lever. The soldering-iron 11 is similarly supported with its lower end also in line with the seam and a little in rear of the lower end of the feed-tube. On the outer end of each lever H is also a gas or vapor burner 12, the end of which is turned inwardly and terminates directly in front of the soldering-iron, against which the flame is thus made to impinge. A tube 13 connects each of these burners with a gas or vapor chamber K, which is supported on arms *k* upon the wheel G. The chamber has a socket 14, which fits loosely over the top of the shaft B, on which the chamber turns as it is carried by the revolution of the wheel.

The chamber K serves as a distributing and mixing chamber. Its upper end is provided with a stuffing-box 15, through which passes the supply of gas or vapor and air from the tubes 16 and 17. The tubes 13 are in this form of machine flexible in whole or part, so that the levers H may be raised at the outer ends to allow the cans to be discharged. This elevation of the outer ends of the levers is caused by a cam-ring 1, fixed to the post B and arranged to depress the inner ends of the levers H when the levers come around to the discharging-point on the right of Figs. 1 and 2. When the inner ends of these levers are on the low part of the cam-track, the soldering-irons and feed-tube are down and their ends close to the seam, as shown on the left of Fig. 1. Within the can-seat (shown more clearly on the right of Fig. 1) is a disk 19, attached to a stem 20, which extends centrally down through the can-seat, spindle, and pinion. Normally it rests on the can-seat directly underneath the can M. It is raised at the point where the can is discharged by means of the cam-track 21, on the high part of which the lower end of the stem rides at that point. At the discharge-point is a shaft N in vertical bearings and driven through beveled gears by a shaft D. Its upper end carries arms $n$, which swing across the path of the cans. When the cans arrive opposite the discharge-chute they meet a stop-arm $m$, and are immediately pushed by one of the arms $n$ laterally on the chute O, the can being at that point lifted to the same plane with the bottom of the chute. As shown in Fig. 2, P P are cooling-tubes for blowing air against the cans for about one quarter of the revolution of the table and just before they are discharged. The discharge ends of the tubes P are arranged to discharge the air onto the seam of the can.

The apparatus for cutting the wire solder is shown on the left of Fig. 1. It consists of ordinary cutting and feeding wheels, which are worked by a pawl moved intermittingly by a lever 22. This apparatus, which carries and cuts the wire solder, is stationary on the base. The tail of the lever 22 extends underneath the master-wheel F, and is worked by a series of inclines 23, which are arranged to cut and deliver a piece of wire to each can as it passes that point where the wire apparatus is located. On the top of the post N is located a brush 24, the edge of which bears against the point of each soldering-iron as it comes into the path of the brush, and thereby the soldering-irons are kept clean.

The soldering-iron, feed-tube, and pin which presses and holds down the cap are held up from the point opposite the discharge until they reach the point $x$ in Fig. 2, so that fresh cans may be put on at the stations $q$ $r$ $s$. After passing this point $x$ they drop into the lower position. The solder-supply apparatus is located at $y$, and as the flame is applied before it reaches this point it begins to heat the can, and thereafter it heats the soldering-iron, and thereby melts and applies the solder. This continues around to the point $z$, where the lever H is lifted sufficiently to raise the soldering-iron from the cap-seam, but not to lift the pin which holds down the cap. This is lifted later on by the further rise of the outer end of the lever before the discharge-point is reached, and by this time the cooling apparatus has effected the cooling of the solder.

In Fig. 4 I have shown a modification by which the freeing of the can from contact with the soldering-iron and holding-down pin is effected wholly by the lowering of the can. In this form I dispense with the levers H, and all the upper parts are stationary on the wheel. The pin which holds down the cap, however, has slight vertical movement, as illustrated in Fig. 4, in order to apply the pressure of the spring. In this form the spindle $e'$, which supports the can-seat, is longer than its bearing in the bracket, and the pinion is also proportionally elongated, so that the can can be lifted, as shown on the left hand of Fig. 4, in the contact with the soldering-iron, pin, and tube above, or dropped out of connection for discharge, as shown on the right hand of Fig. 4. This vertical movement is effected by a cam-track $21^a$, the high part of which is longer than the high and low parts in proportion to cause vertical movement of the can, timed as the vertical movement of the levers H, heretofore described. The cam-track is grooved throughout the high part to allow the stem 20 of the disk to remain down with the disk inside the seat while the can is moving over the high part. The low part has no such groove, but a plane upper surface instead, so that when thereon the stem is held up while the spindle drops, and thereby the can is lifted out of its seat for removal in the same manner as it is lifted in the first form described by the cam-track 21.

Fig. 5 shows a modified form of the discharging-arm. In this only a single arm $n'$ is used. It is pivoted on a standard at 27. It is retracted by a spring 28, and operated by a pin 29, set in a disk on the shaft N, so as to come into range with the tail of the discharge-lever $n'$.

I claim as my invention—

1. In combination, a series of can-seats, a movable carrier therefor, a series of soldering-irons moving with the table, a series of flame-tubes combined with the irons and movable therewith, and means for separating the cans and soldering-irons, substantially as described.

2. In combination, a series of can-seats, a movable carrier therefor, a series of supporting-arms moving with the table, each of said arms carrying a soldering-iron, solder-feed tube, and a flame-tube, substantially as described.

3. In combination with a rotary table carrying revolving can-seats, holding-down pins and soldering-irons carried upon said table in the described relation to the can-seats, with gas or vapor burners for the soldering-irons, and tubes connecting the burners with a common reservoir, substantially as described.

4. In combination with a table and its can-seats and with mechanism for holding the cans, soldering-irons carried upon the table, and burners fixed in the described relation to the soldering-irons, a central reservoir supported on the table and turning therewith, tubes connecting the burners with the gas-chamber, and a supply-pipe for the gas-chamber connected with a suitable stuffing-box, substantially as described.

5. In combination, the moving table carrying can-seats and soldering-irons, an upright revolving shaft arranged in proximity to the said table, and a brush supported horizontally upon said shaft, said brush being in the path of the soldering-irons, substantially as described.

6. In combination, the table carrying can-seats, the upright shaft, the arm N', pivotally supported to have movement across the path of the cans, the spring for retracting the arm, and the pin 29, moved by the shaft for operating said arm, substantially as described.

In testimony whereof I have signed my name to this specification in the presence of two subscribing witnesses.

WM. D. BROOKS.

Witnesses:
H. E. COOPER,
JAMES M. SPEAR.